R. SIEGFRIED.
VEHICLE TRUCK.
APPLICATION FILED APR. 10, 1908. RENEWED MAR. 20, 1911.

1,005,340.

Patented Oct. 10, 1911.

3 SHEETS—SHEET 2.

WITNESSES:
C. L. Belcher
Otto S. Schairer

INVENTOR
Robert Siegfried
BY
Nulty G. Carr
ATTORNEY

COLUMBIA PLANOGRAPH CO., WASHINGTON, D. C.

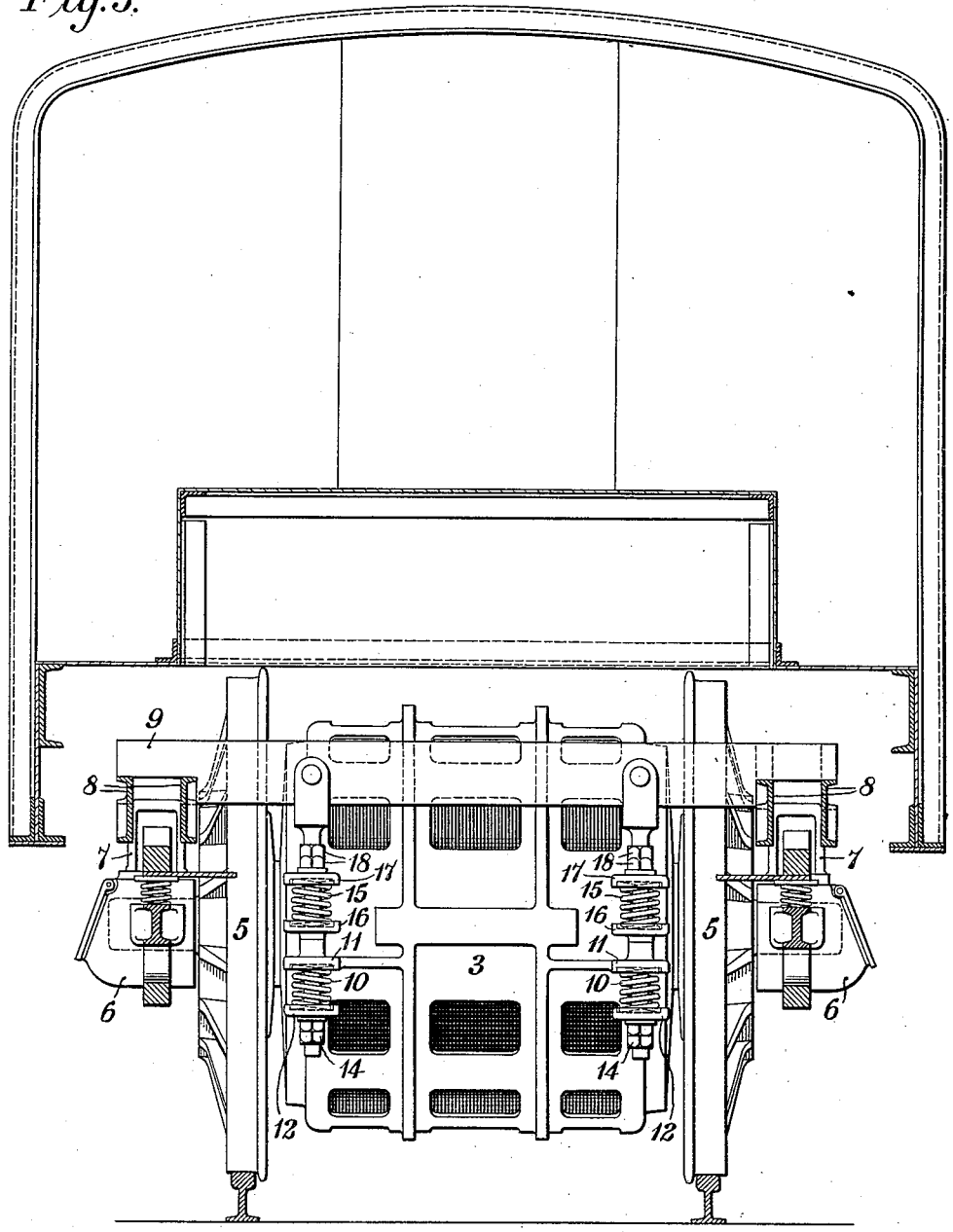

UNITED STATES PATENT OFFICE.

ROBERT SIEGFRIED, OF PITTSBURGH, PENNSYLVANIA, ASSIGNOR, BY MESNE ASSIGNMENTS, TO WESTINGHOUSE ELECTRIC & MANUFACTURING COMPANY, OF PITTSBURGH, PENNSYLVANIA, A CORPORATION OF PENNSYLVANIA.

VEHICLE-TRUCK.

1,005,340.           Specification of Letters Patent.      Patented Oct. 10, 1911.

Application filed April 10, 1908, Serial No. 426,391. Renewed March 20, 1911. Serial No. 615,658.

*To all whom it may concern:*

Be it known that I, ROBERT SIEGFRIED, a citizen of the United States, and a resident of Pittsburgh, in the county of Allegheny and State of Pennsylvania, have invented a new and useful Improvement in Vehicle-Trucks, of which the following is a specification.

My invention relates to vehicle trucks, and particularly to such trucks as are employed in electrically propelled locomotives and other vehicles.

The object of my invention is to provide a vehicle truck so constructed as to obviate the necessity of employing means for opposing the torques of reaction exerted upon the stationary members of the propelling motors which shall be independent of the means employed for resiliently supporting the motors.

In Patent No. 862,198, granted to the Westinghouse Electric & Manufacturing Company, upon an application filed by Charles A. Psilander, is set forth a vehicle truck and suspension means for the motors comprising separate rigid frames surrounding and supporting each of the motors directly upon the journal boxes independently of the main truck frame upon which the cab and other parts of the locomotive are carried. In the arrangement shown in the said patent, it is necessary to provide rods or other members for connecting the stationary members of the motors to some stationary portion of the truck frame in order to oppose the torques of reaction exerted upon the motor frames. In the present instance, however, the necessity for employing such torque-opposing members is obviated, the hanger rods of the motors serving both as suspension means and as torque-opposing means. This result is effected by providing a single rigid frame surrounding all of the motors and employing hanger rods upon both sides of the motors and by also interposing resilient means between both sides of lugs upon the motors and suitable seats carried by the hanger rods.

Figure 1:
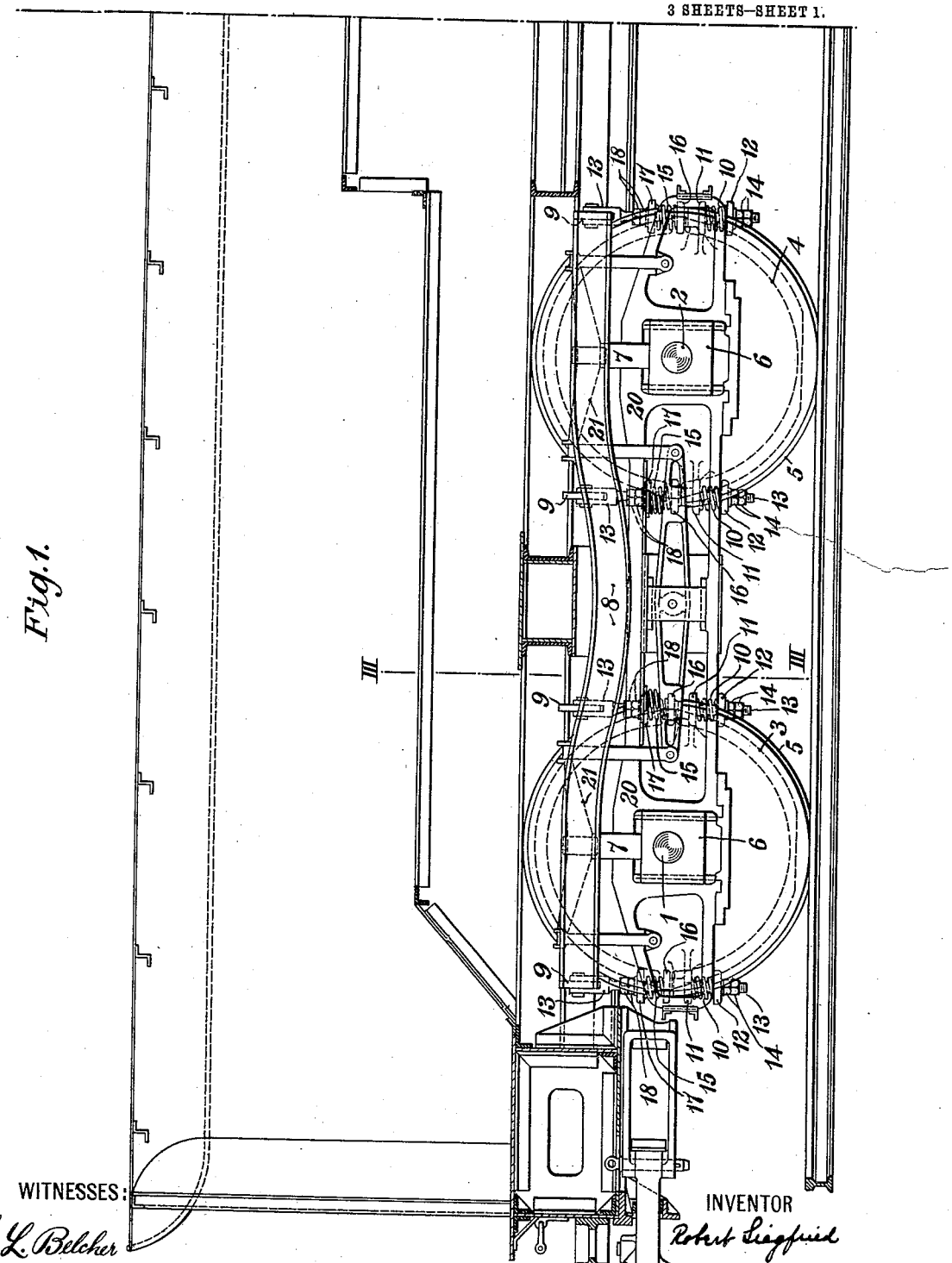
Figure 2:
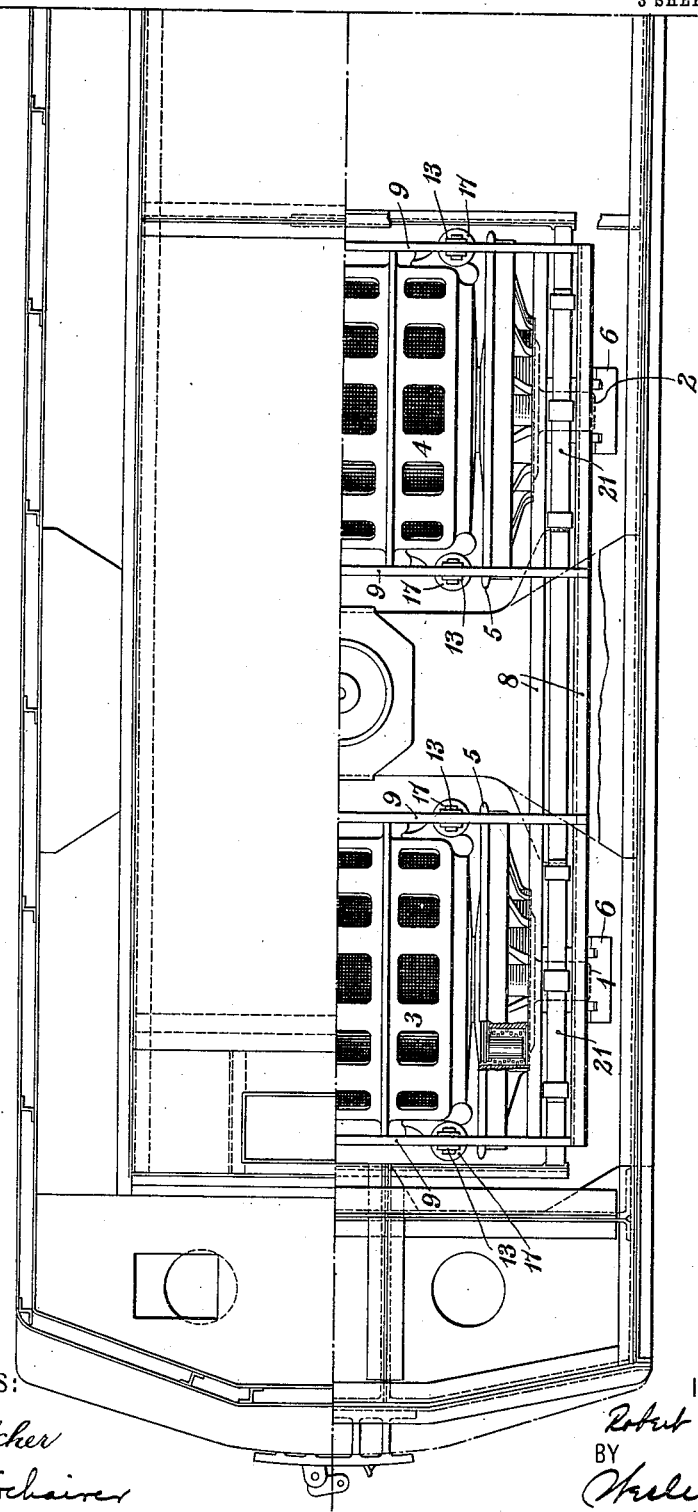

Figure 1 of the accompanying drawings is a view, partially in side elevation and partially in section, of a portion of a locomotive embodying the invention. Fig. 2 is a plan view of the locomotive, one-half of the cab being cut away to expose the running gear, and Fig. 3 is a view in section and in end elevation of the locomotive, upon the line III—III of Fig. 1.

Axles 1 and 2 of the locomotive are surrounded by motors 3 and 4 having operative and resilient connections to driving wheels 5 that are mounted upon and near the ends of the axles, the specific means employed for effecting such connections being that which constitutes the subject-matter of Patent No. 816,611, granted to the Westinghouse Electric & Manufacturing Company, upon an application filed by me. The axles are provided at their ends with journal bearings that are inclosed within boxes or housings 6. Mounted upon the journal boxes 6 are supporting staples or brackets 7 for a rigid frame that surrounds both of the motors and comprises side girders 8 and cross members 9.

The motor frames are resiliently supported upon helical compression springs 10 that are interposed between the lower faces of lugs 11 formed integral with the motor frames and suitable washers or seats 12 that are secured upon the lower ends of hanger rods 13 by means of nuts 14, the forked upper ends of the hanger rods embracing and being secured to the cross members 9 of the aforesaid frame. Helical compression springs 15 are also interposed between washers 16 that bear upon the upper sides of the motor lugs 11 and similar seats 17 that are prevented from moving longitudinally of the hanger rods 13 by means of nuts 18, the springs 15 being provided for the purpose of resiliently opposing the torques of reaction exerted upon the motor frame by the movable members thereof. A main truck frame 20 is also resiliently supported upon the journal boxes 6 by means of leaf springs 21 that bear at their middle points upon the brackets 7, the main truck frame and that which supports the motors being thus separately but resiliently supported upon the journal boxes.

In the operation of the vehicle, two oppositely directed forces will be exerted by the torques of the respective motors upon the central portion of the frame comprising the members 8 and 9, which forces will substantially neutralize each other. A downwardly directed force will also be exerted upon the forward end of the frame comprising the members 8 and 9 and an upwardly directed force will likewise be exerted at the rear end of the said frame. While these forces tend, of course, to effect rotation of the said frame, comparatively little rotary movement will occur because of the great length of the frame and also because it is secured near each end to the journal boxes.

I claim as my invention:

1. The combination with a plurality of axles, and motors operatively connected thereto, of bearings upon the axles, a frame supported upon the bearings and surrounding all of the motors, and means for resiliently suspending the motors from said frame.

2. The combination with a plurality of axles, and motors operatively connected thereto, of bearings upon the axles, a frame supported upon the bearings and surrounding all of the motors, and means for resiliently suspending the motors from, and securing them to, said frame.

3. The combination with a plurality of axles, and motors surrounding the same and operatively connected thereto, of bearings upon the axles, a frame supported upon the bearings and surrounding all of the motors, and means for resiliently suspending the motors from said frame.

4. The combination with a plurality of axles, and motors surrounding the same and operatively connected thereto, of bearings upon the axles, a frame supported upon the bearings, and means for resiliently suspending all of the motors from, and connecting them to, said frame.

5. The combination with a plurality of axles, and motors operatively connected thereto, of bearings upon the axles, a frame mounted upon the bearings, supporting members suspended from said frame and having springs to be engaged by both sides of each of the motors.

6. The combination with a plurality of axles, and motors operatively connected thereto, of bearings upon the axles, a frame mounted upon the bearings, supporting members suspended from said frame and serving to support both sides of each of the motors, lugs upon each side of each of the motors, and springs interposed between the supporting members and both sides of the lugs.

In testimony whereof, I have hereunto subscribed my name this 30th day of March, 1908.

ROBERT SIEGFRIED.

Witnesses:
OTTO S. SCHAIRER,
BIRNEY HINES.

---

Copies of this patent may be obtained for five cents each, by addressing the "Commissioner of Patents, Washington, D. C."